Nov. 20, 1934.  P. H. BODENSTEIN  1,981,161
PREPARATION OF CARBON DISULPHIDE AND HYDROGEN SULPHIDE
Filed Dec. 11, 1931
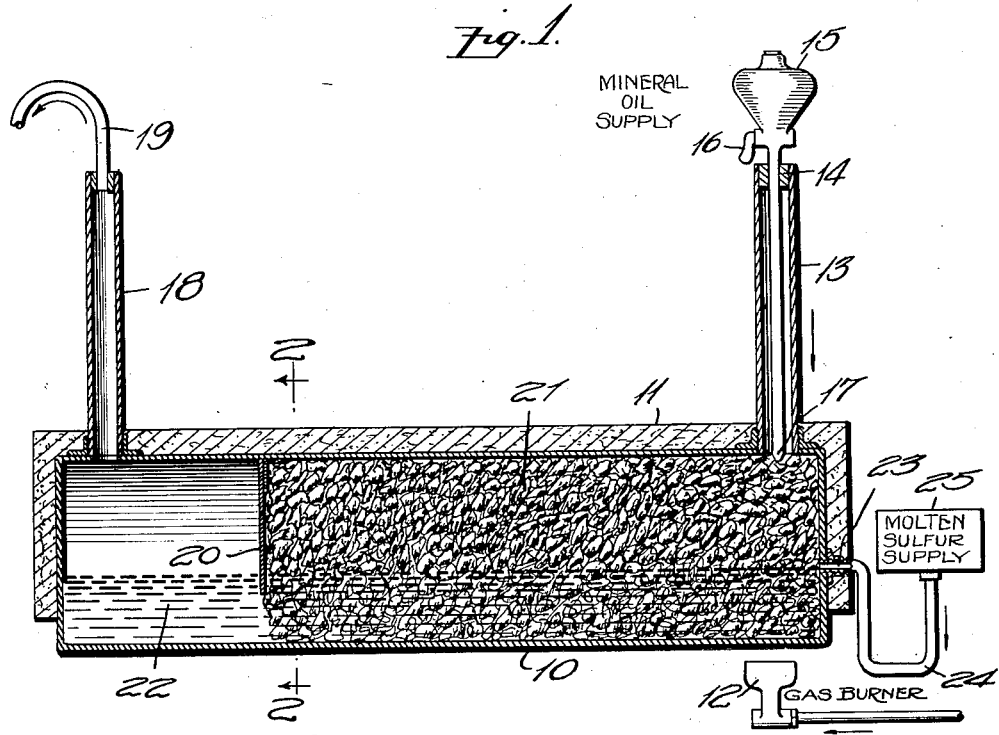
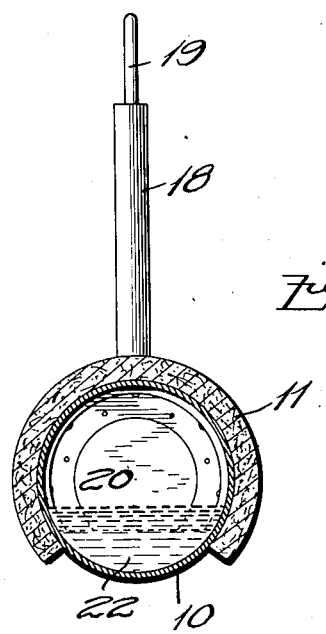
Inventor
PAUL H. BODENSTEIN Patented Nov. 20, 1934

1,981,161

UNITED STATES PATENT OFFICE 1,981,161

PREPARATION OF CARBON DISULPHIDE AND HYDROGEN SULPHIDE

Paul H. Bodenstein, Petersburg, Va., assignor to Meigs, Bassett & Slaughter, Inc., Philadelphia, Pa., a corporation of Pennsylvania Application December 11, 1931, Serial No. 580,442

3 Claims. (Cl. 23—206)

This invention relates to the preparation of carbon disulphide and hydrogen sulphide.

The principal object of the invention is to provide a simple, efficient and commercially practicable process of preparing carbon disulphide and hydrogen sulphide.

Other objects and advantages of the invention will become apparent during the course of the following description.

As is well known, economical production of carbon disulphide and hydrogen sulphide is greatly to be desired in numerous industries, such as the artificial silk industry. Numerous processes for producing carbon disulphide and also hydrogen sulphide are in use and many others have heretofore been proposed. However, these processes are attended with numerous practical disadvantages. In particular, the processes are not adapted for the production of carbon disulphide and hydrogen disulphide on a sufficiently economical basis to allow for best commercial practice. It is the purpose of the present invention to provide a process by which these materials may be simultaneously prepared in an extremely economical and practical manner.

In its broad aspect, my invention involves the contacting of a hydrocarbon, such as a hydrocarbon gas, liquid or melted solid, with an excess of molten sulphur at an elevated temperature in the presence of a catalyst favorable to the reaction of the hydrocarbon with the molten sulphur to form carbon disulphide and hydrogen sulphide.

In the accompanying drawing, I have indicated a type of apparatus suitable for use in the practice of my process. In this showing, Figure 1 is a longitudinal vertical sectional view of the apparatus, parts of the apparatus being indicated diagrammatically, and Figure 2 is a transverse sectional view taken on line 2—2 of Figure 1.

Referring to the accompanying drawing, reference numeral 10 designates a cylindrical horizontal retort formed preferably of cast iron. The cylinder 10 is provided at the ends and throughout its length, except at the bottom portion of the retort, with an insulating covering 11, preferably formed of asbestos. The lower portion of the retort is not insulated for the reason that the retort is heated at this point by means of a suitable strong gas burner 12 arranged below the retort at what may be considered its entrance end. At a point above the gas burner the retort 10 is provided with an elongated tube 13 in the upper end of which is arranged a seal 14 which carries in a central opening a dropping funnel 15 provided with a control valve 16. The lower end 17 of the funnel extends to a point just within the retort 10.

At the opposite end of the retort is arranged an elongated tube 18 which communicates with the interior of the retort and in the upper end of which is sealed an outlet tube 19. The retort 10 is divided into two compartments by means of a baffle plate 20 arranged adjacent the outlet end of the retort and extending to a point adjacent the lower wall of the retort as shown in the drawing. The larger of the two compartments is completely but loosely packed with suitable contact or catalytic material 21. The retort 10 is filled to approximately one-third of its depth with molten sulphur 22 supplied through the pipe 23 connected through the trap 24 with a source of molten sulphur 25 which is heated by any suitable means (not shown) to maintain the sulphur in molten condition.

In the practice of my process the retort 10 is first loosely packed with a catalyst which may consist of sheets, wires, or pieces of pure iron but which preferably consists of similar bodies of an iron-nickel-chromium alloy, especially "stainless steel". In place of a ferrous metal catalyst I may advantageously employ commercial aluminum in the form of wire, sheets, or loosely rolled balls of aluminium foil. Following the charging of the retort with the catalyst, molten sulphur is introduced into the retort from the source of supply 25 and the retort is heated by means of the gas burner 12 to a temperature of from 450 to 700° C. This causes a portion of the sulphur to be vaporized in the upper part of the retort, as will be apparent. Thereupon, the hydrocarbon of the character referred to above, and preferably a hydrocarbon oil, such as ordinary mineral oil, refined mineral oil, fuel oil or the like, is slowly fed into the retort at a point above the burner by means of the conventional dropping funnel 15 or other suitable means. The treatment is not conducted under pressure in the preferred practice of the process but super-atmospheric pressure may be employed if desired or if necessary to maintain the flow of material from the discharge pipe 18. As a result of the foregoing treatment the hydrocarbon material, or pyrogenetic decomposition products thereof, reacts with the molten sulphur, which is in substantially volumetric excess, to form carbon disulphide and hydrogen sulphide. These products are discharged in gaseous form through the tube 18 and pipe 19 into a condenser to separate the carbon disulphide from the hydrogen sulphide or to an alkali scrubber to fix the hydrogen sulphide as an alkali sulphide and condense the carbon disulphide.

In a typical experiment, a cast iron cylinder of the type shown in the drawing approximately 8 inches long and 2 inches in diameter was charged with a catalyst of the character referred to above. Approximately 100 grams of molten sulphur were maintained in the cylinder at a temperature of from 450° to 700° C. A mineral oil, which was a 120 standard white mineral oil, was dropped through a conventional dropping funnel at the approximate rate of three or four drops per minute. In the initial operation of the process a large volume of hydrogen sulphide was formed, the yield of carbon disulphide being relatively low. However, very shortly the catalyst became coated with a thin layer of carbon and as more oil was fed in the carbon disulphide began to come off in small amounts, gradually growing up to a constant flow. After the process had been in operation for a substantial period of time, the retort was opened and it was found that there were no accumulations of carbon other than that covering the catalyst.

As will be apparent, the foregoing process provides a simple process of preparing carbon disulphide and hydrogen sulphide. Moreover, because of the high yields of these compounds from the hydrocarbon materials employed, the process is an extremely advantageous one from an economical standpoint. Obviously, the process is adapted for large scale commercial practice since the same general type of apparatus as that shown in the drawing may be employed and the hydrocarbon material may be added in a constant stream.

While I have described in detail the preferred practice of my process it is to be understood that the details of procedure may be variously modified without departing from the spirit of the invention or the scope of the subjoined claims.

I claim:

1. In a process of the character described the step which comprises contacting a mineral hydrocarbon oil with an excess of molten sulphur at a temperature of from 450° to 700° C. in the presence of a catalyst favorable to the reaction of hydrocarbon constituents of the oil with the sulphur to form carbon disulphide and hydrogen sulphide.

2. In a process of the character described the step which comprises contacting a mineral hydrocarbon oil with an excess of molten sulphur at a temperature of from 450° to 700° C. in the presence of a catalyst selected from the group consisting of iron, aluminum, and iron-nickel-chromium alloys.

3. The process of preparing and recovering carbon disulphide and hydrogen sulphide which comprises contacting a mineral hydrocarbon oil with an excess of molten sulphur at a temperature of from 450° to 700° C. in the presence of a catalyst selected from the group consisting of iron, aluminum and iron-nickel-chromium alloys, and separating and recovering the carbon disulphide and hydrogen sulphide formed.

PAUL H. BODENSTEIN.